UNITED STATES PATENT OFFICE.

HENDRIK BEINS, OF GRONINGEN, KINGDOM OF THE NETHERLANDS.

IMPROVEMENT IN MANUFACTURING CARBONIC ACID.

Specification forming part of Letters Patent No. 152,269, dated June 23, 1874; application filed September 29, 1873.

*To all whom it may concern:*

Be it known that I, Dr. HENDRIK BEINS, of Groningen, in the Kingdom of the Netherlands, have invented a new and Improved Method of Manufacturing Carbonic Acid of any desired tension, and applying the same in a compressed state to different purposes, of which the following is a full and exact description.

The object of my invention is the manufacture of carbonic acid by heating carbonate of lime in a closed retort of any convenient material, and then conducting the produced acid through a pipe, under the pressure of the gas, into a refrigerated reservoir, in which the carbonic acid is collected in a compressed state. The retort, having been filled with lime, is tightly closed, and only one or more holes left through which the carbonic acid ($CO_2$) can escape. The material being heated to a light white heat, the development of the acid begins immediately, and is continued until all $CO_2$ is disengaged. This is effected under a low pressure, and there remains in the retort nothing but caustic lime, which is of a very good quality, even if only made of oyster-shells. When slaked it is perfectly white, soft, and fatty, and free of ashes. Such a furnace and retort consumes less fuel and furnishes a lime superior to that produced by ordinary lime-furnaces.

To work with a temperature as low as possible, the carbonic acid must be conducted out of the retort by a negative pressure—that is to say, drawn out by suction. The carbonic acid can be disengaged at a low pressure if the temperature is reduced. By refrigerating the reservoir a great amount of fuel can be saved, while the retorts will not be worn out so quickly, and all the acid which otherwise would have penetrated to red-heated walls of the retort will be saved.

The vacuum produced in the retort by suction is not great enough that the gases of the fire could penetrate into the retort. The motive power necessary to produce this vacuum can easily be obtained, and in a cheap way, as we shall see below, by the employment of bicarbonate of soda. The same power can be used to move ventilators, which can replace the chimneys of such furnaces. The lime when taken from the retort is in a red-heated state, which said heat may be used to heat the air required for the combustion.

This method of producing carbonic acid can also be effected in an easy way by taking an ordinary gas-pipe of eight to ten centimeters diameter and one meter of length, closed at one end, and filled with lime or any other carbonate. The other end is closed by a plug of wood, perforated, to which a pipe of india-rubber is fixed, the end of which is submerged in a reservoir of lime-water. The pipe containing the carbonate of lime is heated in a furnace or forge, when the carbonic acid is continuously disengaged into the water. The development of the acid is effected in a short time. The lime remaining is completely calcined and can easily be slaked. The carbonic acid obtained in this manner is for all ordinary cases sufficiently pure to bicarbonate the ordinary soda-salt. It may, perhaps, contain a small quantity of fire-gases, which is observed by its odor; but this is no inconvenience for the ordinary uses.

The carbonic acid disengaged contains some carbonic oxide, (CO,) the carbonate employed being always mixed with organic substances. When iron retorts are employed carbonate of iron is often produced, principally during the first part of the work. Afterward the retorts are covered on the inside with a coating of silicate, and they are glazed if made of clay.

In special cases the carbonic acid obtained may be washed in any convenient manner, and even absorbed by carbonate of soda, from which it can be reobtained, completely pure, by heating the mass. By this method carbonic acid is obtained at a very moderate price, the cost of manufacturing being mostly covered by the value of the caustic lime, which is obtained at the same time.

In the same way bicarbonate of soda can be manufactured. Ammonia, common salt, and a surplus of carbonic acid mixed together in convenient proportion furnish bicarbonate of soda and sal-ammoniac, which is of little value, but mixed with lime or magnesia and heated the ammonia is restored. The chloride of calcium or chloride of magnesium produced is worked and employed in the ordinary way.

The pure bicarbonate of soda obtained by my method, or common bicarbonate of soda, as it is in the trade, if sufficiently heated in closed vessels, will be decomposed in carbonate of soda and free carbonic acid, and by this method the disengaged carbonic acid can be obtained under any pressure. More or less heating gives corresponding more or less high tensions of the carbonic acid. A temperature of *circa* 100° centigrade corresponds to a pressure of three to four atmospheres, whereas a heat of 350° to 400° gives acid of a very great tension.

If this carbonic acid is collected at ordinary temperature, say 15°, it is received in fluid state under a pressure of sixty to seventy atmospheres. If the receiver of the carbonic acid can be refrigerated to 0°, the pressure of the fluid acid is only of thirty-seven and one-half atmospheres — namely, the same under which the carbonic gas becomes fluid. Therefore, fluid carbonic acid may be had of any desired tension. For industrial purposes carbonic acid can be obtained, by my method, of various tensions; but that in the fluid state is of most importance.

By experience, I find that reservoirs of various materials, such as hammered copper, cast-steel, glass, &c., are completely impenetrable for this gas at the highest pressure, and that ordinary cocks, well polished, are sufficient to keep the gas in the retort; but I employ, in preference, a cock of a particular construction, if the gas shall be kept a long time, such as for days or weeks. This cock differs from the usual shape by being provided with screwed covers, packed with lead. A cock constructed in this manner will always give satisfaction.

The union-screws, which must be unscrewed before and afterward, are also furnished with lead rings or washers, which form a hermetic joint, and close tighter when those parts are heated; but the heat must not become higher than 100° centigrade, as in that case the lead will get too soft to resist the pressure of the gas. For such cases I employ a refrigerator with water, which gives perfect satisfaction.

To make my invention clearer, and to be better understood, I will now describe, as an example, a very simple construction of an apparatus to produce fluid carbonic acid of very high tension. I take a wrought-iron pipe, open at one end, which open end extends beyond the fire, and heat the same. Through this open end I introduce a convenient iron box containing bicarbonate of soda, and then close the opening by a screw fitted with lead washers, upon which a small stream of water is made to flow. The development of acid will begin immediately the proper amount of heat is obtained.

The gas produced is conducted, through a pipe soldered to the open end of the wrought-iron retort-pipe, to a receiver furnished with a glass gage and a manometer. The receiver must not be completely filled, as the fluid carbonic acid is in an extreme degree expansive when heated.

The receiver must always be kept cool, and it is, therefore, advantageous to remove the same as far as possible from the fire-place and retort. To effect this in the most convenient manner, and to remove the heat of the acid, I prefer to make the receiver to consist of a series of small reservoirs, which offer a greater surface, are at the same time stronger, and in relation not so heavy as one single large receiver. For small trials or experiments I take simply a strong glass pipe as receiver. This pipe is somewhat warmed, and joined to the iron retort by means of ordinary sealing-wax.

The apparatus being constructed in the above-described manner, and the conducting-pipes sufficiently cooled, the fire is brought to 350° to 400° centigrade, when the fluid carbonic acid will flow down into the receiver like water, and may readily be seen increasing, it being clearer than water.

Bicarbonates used for the manufacture are distilled in a few minutes. The third part of the volume, or one-quarter of the weight of the pulverized bicarbonate, being distilled to fluid carbonic acid, the cock is closed, and the charge of bicarbonate in the retort renewed. In this manner it may be continued until the desired quantity of carbonic acid is obtained and received in a liquid state as fluid carbonic acid.

It will easily be understood that carbonic acid produced in the above-described manner will be very cheap, and, converted into fluid carbonic acid, owing to its very great tension, will be well adapted to be employed for motive power, and its employment as such presents no difficulty.

The great evaporating power of the fluid carbonic acid makes it very applicable for ice-machines, and for soda-water manufactures it is the cheapest and purest acid.

The above-described method, and the very high or varying tensions of the fluid carbonic acid, can be easily applied in laboratories for scientific and other useful purposes.

The raw material from which this excellent product is obtained can easily be everywhere procured in great quantities.

I claim—

The within-described process for manufacturing liquid carbonic acid by heating carbonate of lime in a closed vessel or retort, and conducting the produced acid through a pipe, under pressure, into a refrigerated reservoir, substantially as herein set forth.

In testimony that I claim the foregoing I have hereunto set my hand this 7th day of August, 1873.

HENDRIK BEINS.

Witnesses:
 HR. J. H. BOUWER,
 MELLO DIKEMA.